(12) United States Patent
Zebolsky

(10) Patent No.: US 7,296,809 B2
(45) Date of Patent: Nov. 20, 2007

(54) ROTARY CAM ALIGNMENT SYSTEM

(75) Inventor: Michael L. Zebolsky, Marshall, MI (US)

(73) Assignee: Hendrickson USA, L.L.C., Itasca, IL (US)

( * ) Notice: Subject to any disclaimer, the term of this patent is extended or adjusted under 35 U.S.C. 154(b) by 449 days.

(21) Appl. No.: 11/059,053

(22) Filed: Feb. 16, 2005

(65) Prior Publication Data

US 2006/0181044 A1    Aug. 17, 2006

(51) Int. Cl.
    *B60G 7/02*    (2006.01)
(52) U.S. Cl. .............................. 280/86.75; 280/86.751; 280/86.753; 280/124.116
(58) Field of Classification Search ............. 280/86.75, 280/86.751, 86.753, 86.754, 86.756, 86.757, 280/124.111, 124.116
See application file for complete search history.

(56) References Cited

U.S. PATENT DOCUMENTS

| | | | | |
|---|---|---|---|---|
| 996,473 A * | 6/1911 | Estes | ..................... | 280/86.756 |
| 2,900,196 A * | 8/1959 | Nienke | .................. | 280/86.756 |
| 3,960,388 A * | 6/1976 | Strader et al. | ......... | 280/86.757 |
| 4,424,984 A | 1/1984 | Shiratori et al. | | |
| 4,595,216 A * | 6/1986 | Ware | ..................... | 280/86.75 |
| 4,650,208 A | 3/1987 | Mason | | |
| 5,052,711 A | 10/1991 | Pirkey et al. | | |
| 5,163,699 A * | 11/1992 | Specktor | ................ | 280/86.753 |
| 5,201,898 A * | 4/1993 | Pierce | ..................... | 280/86.75 |
| 5,775,719 A | 7/1998 | Holden | | |
| 6,131,930 A * | 10/2000 | Chalin | ..................... | 280/86.75 |
| 6,244,604 B1 * | 6/2001 | McIntyre | ............... | 280/86.753 |
| 6,367,826 B1 * | 4/2002 | Klais | ..................... | 280/86.751 |
| 6,409,189 B1 * | 6/2002 | Orimoto et al. | ....... | 280/86.751 |
| 6,550,795 B1 * | 4/2003 | Schlosser et al. | ........ | 280/86.75 |
| 6,659,479 B1 * | 12/2003 | Raidel, II et al. | ........ | 280/86.75 |
| 2005/0001397 A1* | 1/2005 | Genick, II | ............. | 280/86.754 |
| 2005/0156398 A1* | 7/2005 | Ramsey | ............... | 280/124.116 |

OTHER PUBLICATIONS

Technical Bulletin Hendrickson Suspensions: Quik-Align Pivot Connection Fastener Upgrade, May 2001, (4 pages).
Holland EZ-Align Service Bulletin: Trailer Air Suspension EZ-Align Identification-Old Sytle vs. New Style, Jan. 21, 2002. (2 pages).

* cited by examiner

Primary Examiner—Eric Culbreth
Assistant Examiner—Barry Gooden, Jr.
(74) Attorney, Agent, or Firm—Buckingham, Doolittle & Burroughs, LLP; David P. Dureska; Brent L. Moore

(57) ABSTRACT

A system used for alignment of a vehicle suspension and axle includes a pear-shaped cam that is rotatable relative to one of two spaced plates of a hanger bracket. An aperture and nose in the cam plate is aligned with an elongated opening in the bracket plate. The cam further includes a pin that is configured for insertion and movement within an arcuate aperture in the bracket plate. A fastener extends through the aperture and the nose of the cam, through the elongated openings in the bracket plates, and through the suspension control arm. Rotation of the cam causes a corresponding movement of the pin along the arcuate-shaped aperture of the bracket and of the fastener along the elongated openings of the bracket.

10 Claims, 2 Drawing Sheets

ROTARY CAM ALIGNMENT SYSTEM

BACKGROUND OF THE INVENTION

1. Field of the Invention

This invention relates to vehicle suspensions and, in particular, to a system used for alignment of a vehicle suspension and axle.

2. Disclosure of Related Art

In a conventional vehicle suspension system, a suspension control arm has a first end rigidly connected to an axle of the vehicle and a second end pivotally connected to a bracket descending from the vehicle frame. The second end of the control arm may terminate in a bushing. The bracket generally includes first and second spaced walls that receive the bushing therebetween. A fastener extends through the first wall of the bracket, through the bushing, and through the second wall of the bracket. The fastener may also extend through one or more washers disposed on either side of the bushing between the first and second walls of the bracket. A nut is used to secure the fastener in place relative to the bracket and the control arm pivots about the fastener.

Conventional suspension systems must be aligned in a fore-aft direction to adjust the fore-aft position of the axle relative to the vehicle frame and thereby align the wheels that are supported on the axle. Improper alignment may lead to premature tire wear among other problems. In most conventional suspension systems, alignment is achieved by moving the control arm relative to the bracket descending from the frame. Each of the spaced walls of the bracket generally includes an elongated slot having a major axis that is parallel to the longitudinal direction of the vehicle. The fastener upon which the control arm pivots is moved within these slots to cause corresponding movement in the suspension control arm and axle. In some conventional suspension systems, a weld collar is disposed about the fastener and the position of the collar is adjusted to move the fastener. The collar is then welded to the frame bracket once proper alignment is achieved. These conventional systems are disadvantageous because realignment of the suspension and axle requires removal of the existing welds and the installation of new welds—a process that requires a relatively large amount of time. In other conventional suspension systems, an eccentric cam is disposed about the fastener and the cam is guided by one or more guides on the frame bracket. Rotation of the cam causes displacement of the fastener within the slots of the frame bracket and thereby adjusts the alignment of the suspension and axle. Although these latter systems enable the suspension to be realigned in a relatively short period of time, the systems require additional components and machining of existing suspension components thereby increasing the cost, weight, and complexity of the suspension. These alignment systems may also have a relatively low load capacity that discourages their use with trailers and other high load vehicles.

The inventors herein have recognized a need for a vehicle suspension that will minimize or eliminate one or more of the above-mentioned deficiencies.

SUMMARY OF THE INVENTION

The present invention provides a vehicle suspension and, in particular, a system used for alignment of a vehicle suspension and axle.

A suspension for a vehicle in accordance with the present invention includes a suspension control arm connected to an axle of the vehicle and having one end pivotally connected to a bracket extending from a frame of the vehicle. The bracket includes first and second plates spaced from one another and defining aligned, elongated openings. The first plate further defines an arcuate aperture proximate said elongated opening. The inventive suspension further includes a cam rotatable relative to the first plate of the bracket. The cam defines an aperture and a nose aligned with the elongated opening in the first plate. The nose may be configured for insertion and movement within the elongated opening of the first plate. The cam may further define a pin configured for insertion and movement within the arcuate aperture of the first plate of the bracket. A fastener extends through the aperture in the cam, the elongated openings in the first and second plates of the bracket, and the end of the suspension control arm. Rotation of the cam may cause a corresponding movement of the pin along the arcuate aperture of the first plate of the bracket and of the fastener along the elongated openings in the first and second plates of the bracket.

A suspension in accordance with the present invention has several advantages as compared to conventional suspension systems. First, the inventive system does not require the installation or removal of welds during the alignment process and, therefore, requires less time for realignment of the suspension as compared to many conventional systems. Second, the inventive alignment mechanism has an increased load capacity and may be used with trailers and other high load vehicles. Third, the inventive system is lightweight and uses simple, low-cost methods to manufacture components of the inventive system. As a result, the inventive system weighs less than most conventional systems and is less costly.

These and other features and objects of this invention will become apparent to one skilled in the art from the following detailed description and the accompanying drawings illustrating features of this invention by way of example.

DETAILED DESCRIPTION OF THE PREFERRED EMBODIMENT

Figure 1:
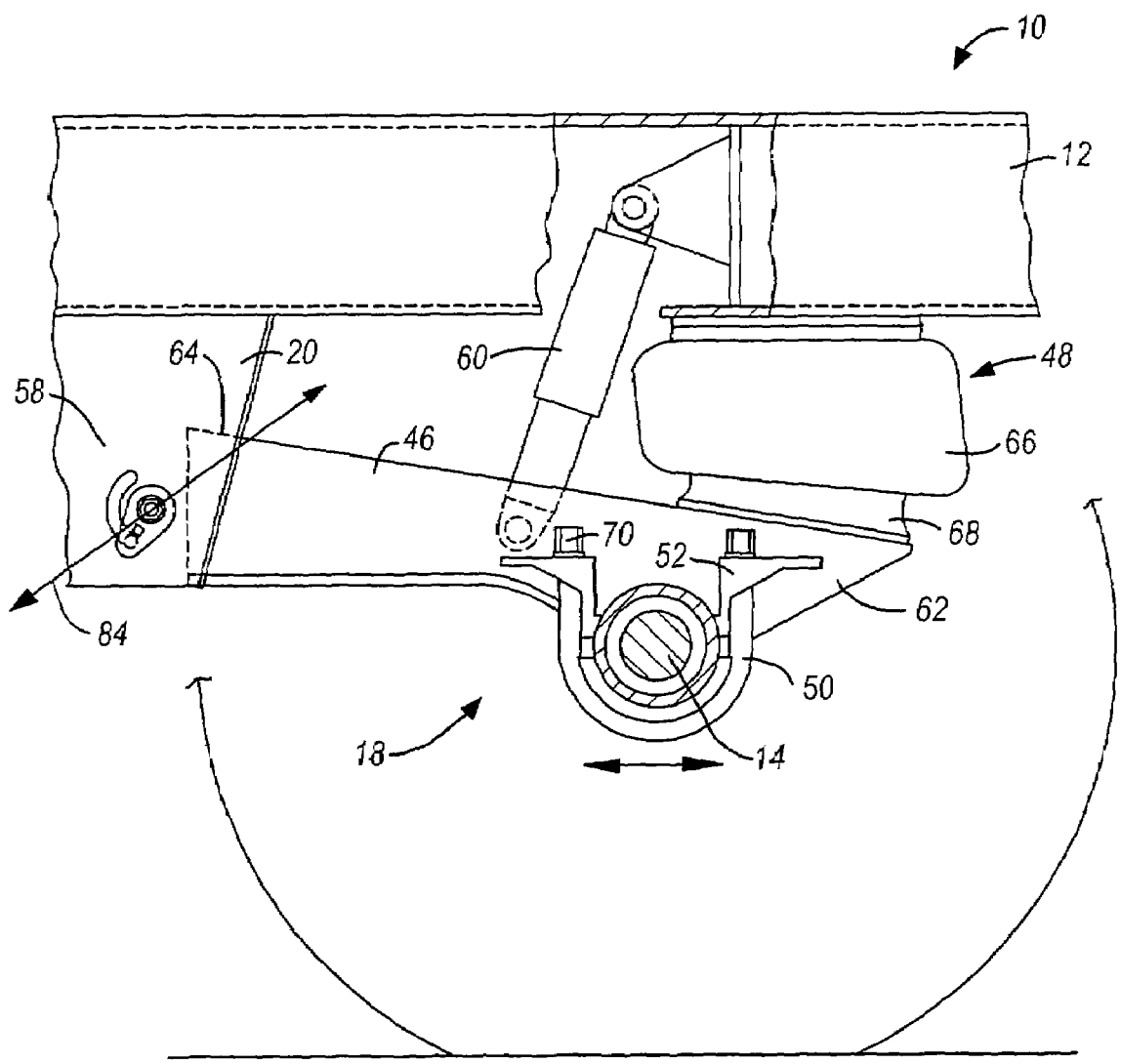
FIG. 1 is a side plan view of a vehicle suspension in accordance with the present invention.

Referring now to the drawings wherein like reference numerals are used to identify identical components in the various views, FIG. 1 illustrates a portion of a vehicle 10. Vehicle 10 may include a frame 12, one or more axles 14, wheels 16, and a suspension 18 in accordance with the present invention. In the illustrated embodiment, vehicle 10 comprises a semi-trailer. It should be understood, however, that the present invention may find application in a wide variety of vehicles.

Frame 12 provides structural support to the body of vehicle 10. Frame 12 is conventional in the art and may be made from conventional metals and metal alloys such as steel. Frame 12 may include a pair of longitudinal rails (only one of which is shown in FIG. 1) and cross-members as is conventional in the art. Frame 12 may also include a plurality of mounting brackets, such as bracket 20, for mounting various components of vehicle 10 including suspension 18.

Figure 2:
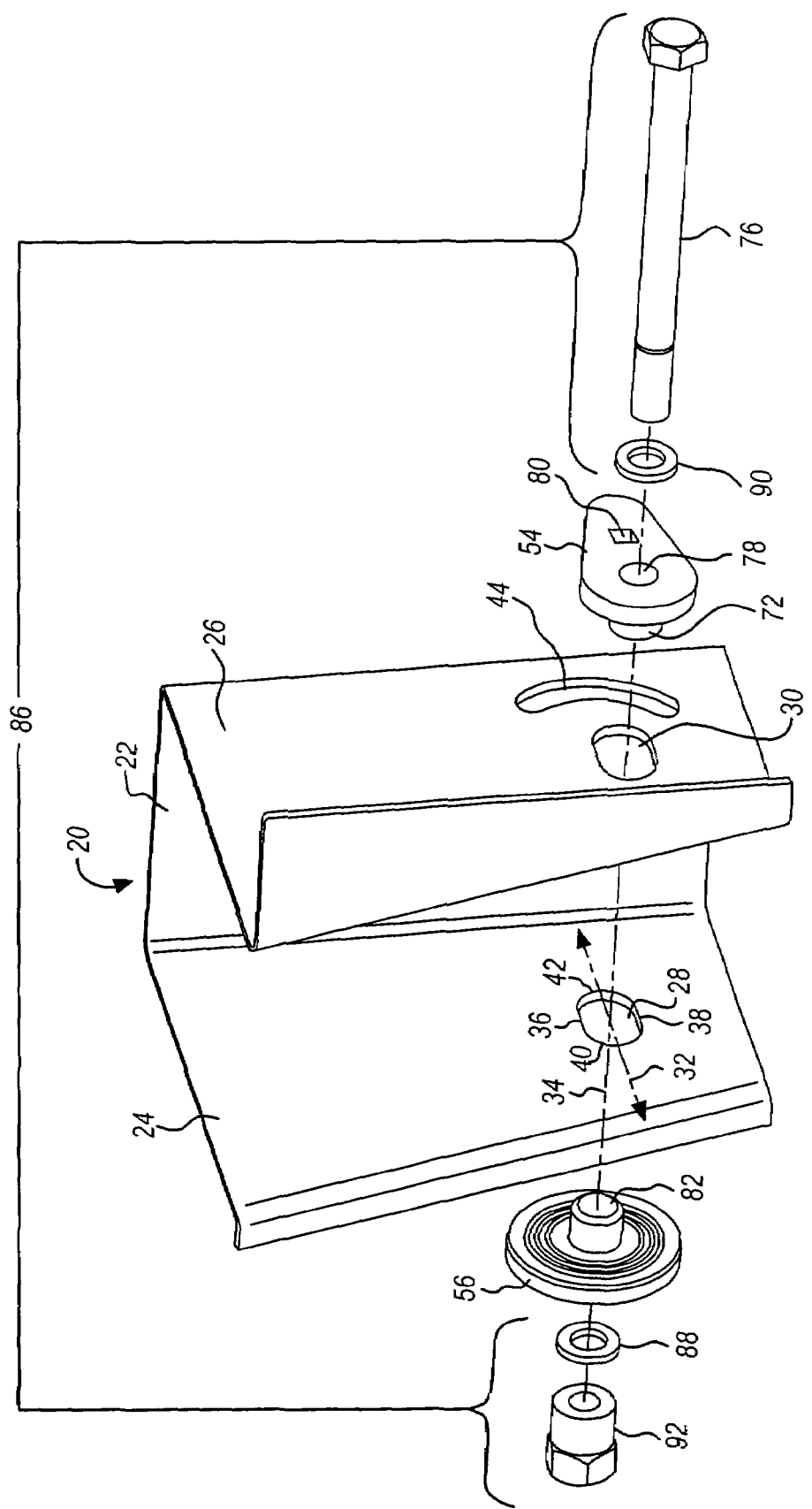
FIG. 2 is an exploded perspective view of a portion of the suspension of FIG. 1.

Referring to FIG. 2, bracket 20 will be described in greater detail. Bracket 20 is provided to pivotally mount suspension 18 to frame 12 and is conventional in the art. Bracket 20 includes a center plate 22 and a pair of inboard and outboard spaced side plates 24, 26 and may be welded to or integral with frame 12. Side plates 24, 26 include aligned, elongated slots 28, 30 that enable fore-aft alignment of suspension 18 and axle 14. Slots 28, 30 each have a major axis 32 that is generally parallel to the longitudinal direction of vehicle 10 and a minor axis 34 that is generally perpendicular to the longitudinal direction of vehicle 10 (only one set of axes being illustrated in FIG. 2). Each of slots 28, 30 may have a flat portion 36, 38 on either side of major axis 32 and a curved portion 40, 42 on either side of minor axis 34. Side plate 26 may further include an arcuate-shaped aperture 44 disposed proximate elongated slot 30. Arcuate-shaped aperture 44 may be disposed so that aperture 44 arcs around curved portion 42 of elongated slot 30 and the major axis 34 at slot 30 extends through aperture 44. In the illustrated embodiment of FIG. 1, aperture 44 is disposed forwardly of slot 30 relative to the direction of vehicle travel. It should be understood, however, that aperture 44 may alternatively be located rearwardly of slot 30.

Referring again to FIG. 1, axle 14 is provided to support frame 12 on wheels 16 and also provides mounting surfaces for various suspension and brake components. Axle 14 is conventional in the art and may be made from conventional metals and metal alloys such as steel. Axle 14 extends in a transverse direction relative to vehicle 10 and may support one or more wheels 16 on each end.

Wheels 16 are provided to support vehicle 10 and are also conventional in the art. Wheels 16 are supported for rotation on each end of axle 14 and include tires mounted thereon.

Suspension 18 is provided to couple axle 14 to frame 12 and to allow for movement of axle 14 relative to frame 12. In the illustrated embodiment only one suspension assembly is shown. It should be understood, however, that a similar assembly may be disposed at the opposite end of axle 14 on the other side of vehicle 10. Suspension 18 may include a control arm 46, a spring assembly 48, and means, such as U-bolt 50 and bracket 52, for mounting arm 46 to axle 14. Suspension 18 may also include cam 54, disc 56, and means, such as mounting assembly 58, for pivotally mounting arm 46 to frame 12. It will be understood that suspension 18 may also include other conventional suspension elements, such as shock absorber 60, that are not described in detail herein.

Control arm 46 provides a structural framework for suspension 18 and movably couples axle 14 to frame 12. Arm 46 is conventional in the art and may be made from conventional metals and metal alloys such as steel. In the illustrated embodiment, arm 46 comprises a conventional overslung trailing arm construction. It should be understood by those in the art, however, that the inventive alignment device may be used in suspensions having a wide variety of control arms. One end 62 of arm 46 (the rearward end in the illustrated embodiment) may provide a mounting surface for spring assembly 48. Another end 64 of arm 46 (the forward end in the illustrated embodiment) is received within side plates 24, 26 of bracket 20 and is pivotally mounted to bracket 20 by mounting assembly 58, as described in greater detail hereinbelow.

Spring assembly 48 is provided to dampen movement of frame 12 responsive to variations in the surface over which vehicle 10 is traveling. Spring assembly 48 is conventional in the art. In the illustrated embodiment, assembly 48 comprises a conventional air spring 66 incorporating a piston 68 that controls air pressure within spring 66. Piston 68 is mounted to end 62 of arm 46 in abutting relation with spring 66. It should be understood by those in the art that a variety of known configurations for air or mechanical springs could be used without departing from the spirit of the present invention.

U-bolt 50 and bracket 52 are provided to fixedly couple control arm 46 to axle 14 and are conventional in the art. U-bolt 50 is disposed about axle 14 and its ends are received in bracket 52 and secured thereto using nuts 70. Bracket 52 may be welded to arm 46 or integral with arm 46. It should be understood by those in the art that arm 46 may be coupled to axle 14 in a variety of ways without departing from the spirit of the present invention. For example arm 46 may be welded to axle 14 or may be coupled to axle 14 using a variety of clamps that are disposed about axle 14 and coupled together.

Referring to FIG. 2, cam 54 is provided to function as a suspension alignment device. Cam 54 may be disposed on an outboard side (relative to the vehicle) of outboard side plate 26 of bracket 20. However, it should be understood by those in the art that cam 54 may also be disposed on an inboard side (relative to the vehicle) of inboard side plate 24 of bracket 20. Cam 54 may be generally pear-shaped. However, it should be understood by those in the art that cam 54 may comprise a variety of shapes, such as a rectangular shape, without departing from the spirit of the present invention. Cam 54 may be made from conventional metals and metal alloys such as steel. The components of the inventive rotary cam alignment system, including cam 54, are manufactured using simple low cost methods. In accordance with the low cost manufacturing methods of system components, cam 54 may be stamped or laser cut depending on the required quantity of components desired. Cam 54 defines a nose 72 and a follower pin 74 (best shown in FIG. 3).

Nose 72 cooperates with slot 30 to cause movement of a fastener 76 (to be described in detail further below) in a fore and aft direction enabling alignment of the suspension 18. Nose 72 is generally circular in shape and is recessed with slot 30 upon assembly. An aperture 78 extends through cam 54 and nose 72 is sized to receive fastener 76. Nose 72 and aperture 78 are aligned with slots 28, 30 in side plates 24, 26 of bracket 20. Nose 72 may extend toward bracket 20 and may be configured for insertion and movement within elongated slot 30 of wall 26 of bracket 20. Nose 72 may extend through bracket 20 and into a bushing (not shown) disposed within end 64 of control arm 46.

Figure 3:
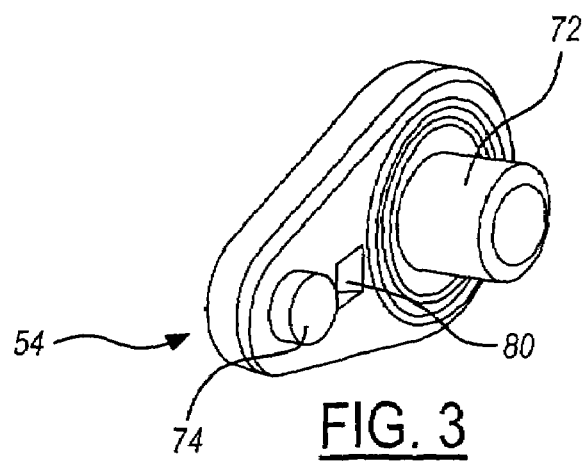
FIG. 3 is another perspective view of the cam of FIG. 2.

Pin 74 is provided for insertion and movement within arcuate-shaped aperture 44 of bracket 20. Follower pin 74 may be best viewed in FIG. 3, showing another perspective view of cam 54. Follower pin 74 may be disposed on the same side of cam 54 as nose 72 and may extend toward bracket 20. Referring again to FIG. 2, rotation of cam 54 creates a motion of follower pin 74 within arcuate-shaped aperture 44 and creates a motion of nose 72 and fastener 76 in the fore/aft direction. This rotation of cam plate 54 enables proper alignment of the suspension 18.

Cam 54 may also define a recess 80 in an outboard side. Recess 80 is provided for engagement by a tool (not shown) for rotating cam 54. Recess 80 may be generally rectangular in shape, although those of ordinary skill in the art will recognize that various other shapes remain within the spirit and scope of the invention. It should also be understood that a variety of structures may be provided to allow engagement of cam 54 by conventional tools. For example, a plurality of recesses may be configured to receive a tool for rotation of cam 54 to enable alignment of the vehicle suspension 18.

Cam 54 may alternatively include a flange configured for engagement by a tool for rotation of cam 54 to enable alignment of the vehicle suspension 18. In an exemplary embodiment, a tool, such as a ratchet or breaker bar, may engage recess 80 in order to rotate cam 54. Rotation of cam 54 causes movement of nose 72 within slot 30 of bracket 20. Accordingly, fastener 76 is thereby forced to travel fore or aft, depending upon the rotation direction, within slot 30 of bracket 20.

Disc 56 is provided to receive fastener 76. Disc 56 may be disposed on an inboard side (relative to the vehicle) of inboard side plate 24 of bracket 20. Disc 56 may be generally circular in shape. Disc 56 may be made from conventional metals and metal alloys such as steel. In accordance with the low cost manufacturing methods of system components, disc 56 may be stamped or laser cut depending on the required quantity of components desired. Disc 56 may include nose 82 extending from disc 56. Nose 82 may define a generally circular opening that may be configured for receiving fastener 76. Nose 82 may extend toward bracket 20 and may be configured for insertion and movement within elongated slot 28 of wall 24 of bracket 20. Nose 82 may extend through bracket 20 and into a bushing (not shown) disposed within end 64 of control arm 46.

Referring now to FIG. 1, mounting assembly 58 is provided to couple suspension 18 to frame 12 and to allow pivotal motion of end 64 of control arm 46 about an axis 84 extending transverse to the longitudinal direction of vehicle 10. Mounting assembly 58 may include a bushing (not shown) and a fastener assembly 86.

The bushing is provided to allow rotation of arm 46 about a fastener 76 of fastener assembly 86. The bushing is conventional in the art and is generally affixed to, or disposed within, end 64 of control arm 46. The bushing may include a sleeve that may be made from metal or metal alloys and further may include an elastomeric material such as rubber disposed about the sleeve. The bushing may also include a housing disposed radially outwardly of the metal sleeve and elastomeric material. The sleeve of the bushing may include a throughbore that is sized to receive a fastener 76 of assembly 86. The sleeve may define a boss at either end that extends outwardly from the bushing.

Fastener assembly 86 is provided to secure end 64 of control arm 46 to bracket 20. Assembly 86 may include a fastener 76, washers 88, 90, and a nut 92. Fastener 76 may comprise a screw, bolt, pin, or other conventional fastener. Fastener 76 extends through aperture 78 and nose 72 in cam 54, through slot 30 in side plate 26 of bracket 20, through end 64 of suspension control arm 46, through slot 28 in side plate 24 of bracket 20, and through nose 82 in disc 56. Once the proper predetermined position has been established for the fastener 76 in slots 28, 30, fastener 76 may then be secured in place using washers 88, 90 and nut 92 in a conventional manner. Proper alignment of suspension 18 may minimize tire wear. Rotation of cam 54 causes a corresponding movement of follower pin 74 in arcuate-shaped aperture 44 and nose 72 in slot 30. This action moves fastener 76 in a fore-aft direction within the elongated openings 28, 30 in the bracket side walls 24, 26.

Referring to FIGS. 1-3, a method for aligning a vehicle suspension 18 and axle 14 in accordance with the present invention will be described. The method includes the step of providing a suspension control arm 46 connected to the axle 14 of the vehicle 10 and having an end pivotally connected to a bracket 20 extending from a frame 12 of the vehicle 10. The bracket 20 includes plates 24, 26 spaced from one another and defining aligned elongated openings 28, 30. Plate 26 further defines an arcuate aperture 44 proximate elongated opening 30. The method further includes the step of providing a cam 54 configured for rotation relative to bracket 20 with cam 54 defining an aperture 78 and a nose 72 aligned with elongated opening 30 in plate 26 of bracket 20. Nose 72 is configured for insertion and movement within elongated opening 30 of plate 26. Cam 54 further defines a pin 74 configured for insertion and movement within arcuate aperture 44 of plate 26 of bracket 20. The method further includes the step of providing a fastener 76 extending through aperture 78 and nose 72 of cam 54, the elongated openings 28, 30 in plates 24, 26 of the bracket 20, and the end of suspension control arm 46. The method may further include the step of providing a disc 56 with a nose 82 aligned with the elongated opening 28 in plate 24 of the bracket 20, the nose 82 configured to receive the fastener 76. Finally, the method includes the step of rotating cam 54 to cause a corresponding movement of pin 74 along arcuate aperture 44 of plate 26 of bracket 20 and of fastener 76 along elongated openings 28, 30 in plates 24, 26 of bracket 20. This step may include the substep of inserting a tool into a recess 80 in the cam 54. This rotation causes fore-aft movement of fastener 76 within slot 30 of side plate 26 of bracket 20, thereby aligning suspension 18 and axle 14.

A suspension 18 and rotary cam alignment system in accordance with the present invention represents a significant improvement as compared to conventional suspension systems. First, the inventive system does not require the installation or removal of welds during the alignment process and, therefore, requires less time for realignment of the suspension as compared to many conventional systems. Second, the inventive alignment mechanism has an increased load capacity and may be used with trailers and other high load vehicles. Third, the inventive system is lightweight and uses simple, low-cost methods to manufacture components of the inventive system. As a result, the inventive system weighs less than most conventional systems and is less costly.

While the invention has been particularly shown and described with reference to the preferred embodiments thereof, it is well understood by those skilled in the art that various changes and modifications can be made in the invention without departing from the spirit and scope of the invention.

I claim:

1. A suspension for a vehicle, comprising:
 a suspension control arm connected to an axle of said vehicle and having an end pivotally connected to a bracket extending from a frame of the vehicle, said bracket including a first plate and a second plate, said first and second plates being spaced-apart, each one of the first and second plates being formed with an elongated opening, said elongated openings of said first and second plates being aligned, said first plate being formed with an arcuate aperture proximate said elongated opening of the first plate, said arcuate aperture being a distance from an intersection point of a major axis and a minor axis of the elongated opening of said first plate, said distance being variable along a length of the arcuate aperture;
 a cam rotatable relative to said first plate of said bracket, said cam being formed with an aperture and a nose aligned with said elongated opening in the first plate, said nose being inserted and moveable within the elongated opening of said first plate, the cam including a pin being inserted and moveable within said arcuate aperture of the first plate of the bracket;

a fastener extending through said aperture in said cam, through said elongated openings in said first and second plates of said bracket, and through said end of said suspension control arm; and wherein rotation of said cam causes a movement of said pin along said arcuate aperture of said first plate of said bracket, whereby said movement of the pin and said variable distance between said arcuate aperture and said intersection point of said major and minor axes of said elongated opening of the first plate causes a corresponding movement of said fastener along the elongated openings in said first and second plates of the bracket for aligning said suspension and said axle relative to said frame of said vehicle.

2. The suspension of claim 1 wherein said nose of said cam is generally circular.

3. The suspension of claim 1 wherein said cam is formed with a recess configured to receive a tool for rotation of said cam to thereby align said suspension and said axle of said vehicle.

4. The suspension of claim 1 wherein said major axis of said elongated opening of said first plate extends through said arcuate aperture of the first plate.

5. The suspension of claim 4 wherein said arcuate aperture is disposed on one of a rearward side or a forward side of said elongated opening of said first plate.

6. The suspension of claim 1 further comprising a disc being rotatable relative to said second plate of said bracket, said disc having a nose configured to receive said fastener, said nose of said disc aligned with said elongated opening in the second plate.

7. The suspension of claim 6 wherein said cam is disposed outboard of said disc.

8. A method for aligning a suspension and an axle of a vehicle, comprising the steps of:

providing a suspension control arm connected to said axle of said vehicle and having an end pivotally connected to a bracket extending from a frame of the vehicle, said bracket including a first plate and a second plate, said first and second plates being spaced-apart, each one of the first and second plates being formed with an elongated opening, said elongated openings of said first and second plates being aligned, said first plate being formed with an arcuate aperture proximate said elongated opening of the first plate, said arcuate aperture being a distance from an intersection point of a major axis and a minor axis of the elongated opening of said first plate, said distance being variable along a length of the arcuate aperture;

providing a cam configured to be rotatable relative to said first plate of said bracket, said cam being formed with an aperture and a nose aligned with said elongated opening in the first plate, said nose being inserted and moveable within the elongated opening of said first plate, the cam including a pin being inserted and moveable within said arcuate aperture of the first plate of said the bracket;

providing a fastener extending through said aperture and said nose of said cam, through said elongated openings in said first and second plates of said bracket, and through said end of said suspension control arm; and, rotating said cam to cause a movement of said pin along said arcuate aperture of said first plate of said bracket, whereby said movement of the pin and said variable distance between said arcuate aperture and said intersection point of said major and minor axes of said elongated opening of the first plate causes a corresponding movement of said fastener along the elongated openings in said first and second plates of the bracket for aligning said suspension and said axle relative to said frame of said vehicle.

9. The method of claim 8 wherein said rotating step further includes the substep of inserting a tool into a recess in said cam.

10. The method of claim 8 further comprising the step of providing a disc rotatable relative to said second plate of said bracket, said disc having a nose aligned with said elongated opening in the second plate of the bracket, said nose configured to receive said fastener.

* * * * *

UNITED STATES PATENT AND TRADEMARK OFFICE
CERTIFICATE OF CORRECTION

PATENT NO. : 7,296,809 B2
APPLICATION NO. : 11/059053
DATED : November 20, 2007
INVENTOR(S) : Michael L. Zebolsky Page 1 of 1

It is certified that error appears in the above-identified patent and that said Letters Patent is hereby corrected as shown below:

Claim 8, Column 8, line 16, by deleting the word "said".

Signed and Sealed this

Twenty Second Day of April, 2008

JON W. DUDAS
*Director of the United States Patent and Trademark Office*